United States Patent [19]

Wada

[11] Patent Number: 4,844,623

[45] Date of Patent: Jul. 4, 1989

[54] ELECTRONIC THERMOMETER

[75] Inventor: Yoshihiro Wada, Nara, Japan

[73] Assignee: Sharp Kabushiki Kaisha, Osaka, Japan

[21] Appl. No.: 37,003

[22] Filed: Apr. 10, 1987

[30] Foreign Application Priority Data

Apr. 11, 1986 [JP] Japan .................................. 61-84694

[51] Int. Cl.[4] ......................... G01K 7/22; G01K 7/24
[52] U.S. Cl. ..................................... 374/171; 374/172
[58] Field of Search ................................. 374/171, 172

[56] References Cited

U.S. PATENT DOCUMENTS

| 3,793,630 | 2/1974 | Meijer | 374/171 |
| 3,824,585 | 7/1974 | Meijer | 374/171 |
| 4,031,530 | 6/1977 | Aneshansley | 374/171 |
| 4,045,658 | 8/1977 | Peltola et al. | 374/171 |
| 4,210,024 | 7/1980 | Ishiwatari | 374/171 |
| 4,559,954 | 12/1985 | Murase | 374/171 |
| 4,602,871 | 7/1986 | Hanaoka | 374/171 |

FOREIGN PATENT DOCUMENTS

| 2753871 | 6/1978 | Fed. Rep. of Germany . | |
| 3300836 | 1/1983 | Fed. Rep. of Germany . | |
| 0158427 | 1/1983 | German Democratic Rep. | 374/171 |
| 0161628 | 10/1982 | Japan | 374/171 |
| 0178232 | 10/1983 | Japan | 374/171 |
| 2144226 | 2/1985 | United Kingdom | 374/171 |
| 2157515 | 10/1985 | United Kingdom | 374/170 |

Primary Examiner—William A. Cuchlinski, Jr.
Assistant Examiner—Thomas B. Will
Attorney, Agent, or Firm—Birch, Stewart, Kolasch & Birch

[57] ABSTRACT

An electronic thermometer includes: an oscillator capable of changing from a connection between a reference resistance and a capacitor and a resistance bulb and the capacitor. A counter is used for counting the oscillation frequency of the oscillator, and a clock is used to measure the time needed for the counter to count up to a specified number. The thermometer uses a memory circuit for preliminarily storing data to be used in a linearization process. A control circuit is included for linearizing the temperature to be detected by suppressing certain count pulses on a count by count basis according to data stored in a one-bit ROM. The temperature is then displayed by a display device.

6 Claims, 2 Drawing Sheets

ELECTRONIC THERMOMETER

BACKGROUND OF THE INVENTION

This invention relates to a thermometer for detecting the temperature by utilizing the dependency of resistance on the temperature of a resistance bulb, and more particularly, to a digital thermometer for detecting the changes in the resistance by the variation of oscillation frequency of an oscillator.

It is generally known to measure the temperature from an oscillation frequency by using a resistance bulb in part of a CR oscillation circuit.

The oscillation frequency F is, in a practically negligible error range, given as follows when using a proportional constant K:

$$F = \frac{K}{C \cdot R} \quad (1)$$

If the resistance bulb is a thermistor, the relation between the resistance R of thermistor and absolute temperature T is theoretically expressed as follows:

$$R = Ro \cdot \exp B \left( \frac{1}{T} - \frac{1}{To} \right) \quad (2)$$

where Ro is the thermistor resistance when the absolute temperature is To, and B is the thermistor constant. From equations (1) and (2), the absolute temperature T is expressed in terms of the oscillation frequency F as shown in equation (3):

$$T = \frac{1}{\frac{1}{To} + \frac{1}{B} \cdot (\ln Fo - \ln F)} \quad (3)$$

where Fo is the oscillation frequency at absolute temperature To.

Therefore, by measuring the oscillation frequency, the temperature is known.

In the conventionally known thermometers, however, many circuit elements were needed, and it was unsuited for reducing the cost.

SUMMARY OF THE INVENTION

It is hence a primary objective of this invention to present a thermometer capable of lowering the cost by reducing the number of parts.

In order to realize the above and other objectives, this invention presents a thermometer comprising:

an oscillator capable of changing over a connection between a reference resistance and a resistance bulb;

a counter for counting the oscillation frequency of the oscillator;

a clock means for measuring the time until the counter counts up to a specified number;

a memory circuit in which specific data is preliminarily stored;

a control means for controlling the number of counts by the output from the memory circuit, when counting, by the counter, the oscillation frequency of the oscillator to which the resistance bulb is connected, within a time equal to the time measured by the clock means by connecting the reference resistance to the oscillator; and a display means for displaying the number of counts or a correlated numerical value, wherein the memory circuit is composed of a memory predetermined to correct the nonlinearity against the temperature of said resistance bulb.

According to this invention, having the memory predetermined to correct the nonlinearity of resistance vs. temperature of the resistance bulb incorporated in the memory circuit, when the oscillation output of the oscillator possessing the resistance bulb is counted by the counter, the output of the memory circuit controls this count number.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
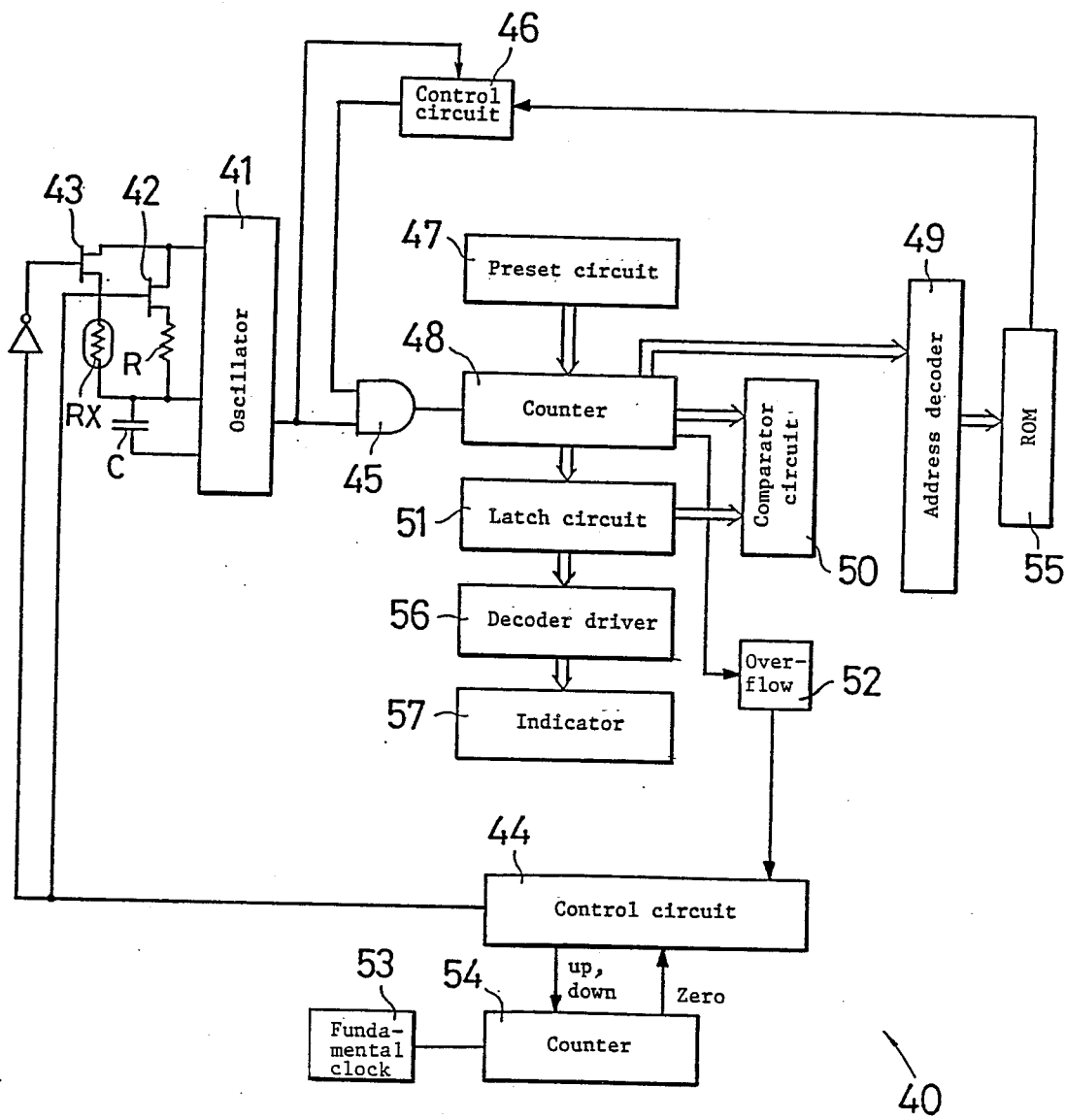
FIG. 1 is a circuit block diagram of a thermometer according to one of the embodiments of the present invention.
Figure 2:
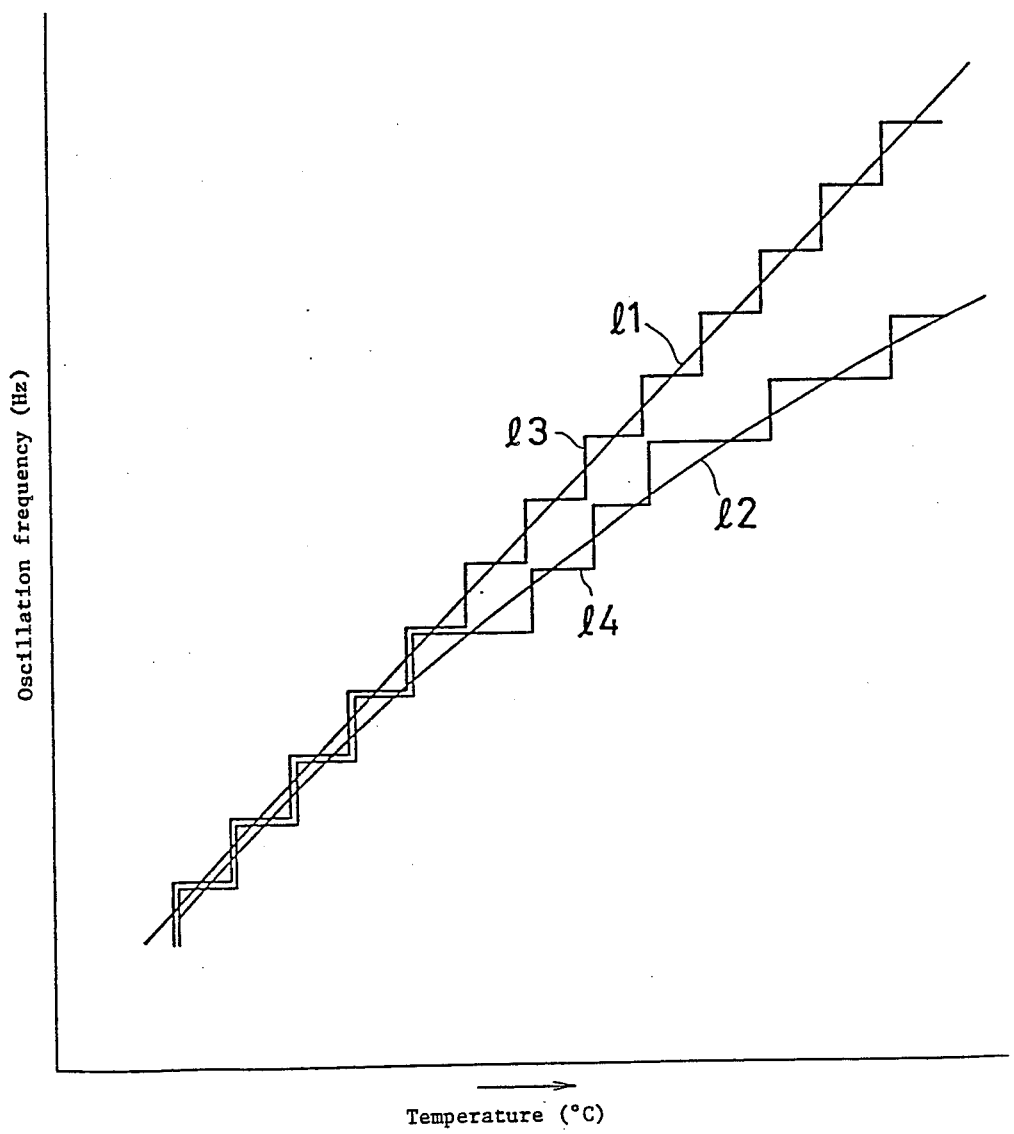
FIG. 2 is a graph showing the method of correction of nonlinearity of a thermistor.

FIG. 1 is a circuit block diagram of a thermometer according to one of the embodiments of the present invention, and FIG. 2 is a graph showing the method of correction of nonlinearity of a thermistor Rx. Here, the thermometer 40 is designed to be used as a clinical thermometer, indicating the temperature in a range of, for example, 35 to 42 degrees centigrade at 0.1 degree increments. In FIG. 1, the reference resistance R and thermistor Rx are connected with capacitor C. An oscillator 41 oscillates at a frequency determined by the time constant of the capacitor C and thermistor Rx or reference resistance R. At this time, one period of the output pulse of the oscillator 41 is preset so that the temperature difference of the temperature being measured corresponds to 0.1 degree centigrade. Between the reference resistance R and the oscillator 41, an analog switch 42 is inserted, and between the thermistor Rx and the oscillator 41, an analog switch 43 is inserted. Switching of these analog switches 42, and 43 is controlled by a control circuit 44.

The oscillation output of the oscillator 41 is applied to one of the input sides of an AND gate circuit 45 and control circuit 46. The output of the AND gate circuit 45 is applied to a counter 48 which is preset to a specified numerical value by a preset circuit 47. This output causes the counter 48 to execute counting. The output of counter 48 is fed to an address decoder 49 as an address signal, and is simultaneously applied to a comparator circuit 50. The value held in a latch circuit 51 and the output value of the counter 48 are compared in the comparator circuit 50. When the output value of the counter 48 is greater than the value held in the latch circuit 51, the output value of the counter 48 is fed into and held by the latch circuit 51.

When the counter 48 counts up to a specified constant and the count value exceeds this specified constant, an overflow output is applied to the control circuit 44 by way of an overflow circuit 52. On the other hand, this control circuit 44 is connected a counter 54 to which is given the output of a reference clock oscillator 53 which oscillates at specified clock frequency. This reference clock oscillator 53 and counter 54 measure the time until the counter 48 overflows of said counter 48.

The memory content of ROM 55 connected to the address decoder 49 is a 1-bit data memory of 1's or 0's. The control circuit 44 first closes the analog switch 42, and connects the reference resistance R to the oscillator 41 to oscillate. At this time, the AND gate circuit 45 is open, and the oscillation output is counted by the counter 48 through the AND gate circuit 45, while the output of the reference clock oscillator 53 is counted by the counter 54. The control circuit 44 stops counting of the counter 54 when the counter 48 overflows.

Next, the control circuit 44 opens the analog switch 42 and closes the analog switch 43, thereby connecting the thermistor Rx to the oscillator 41. At the same time, down-counting of the counter 54 starts, and the preset circuit 47 sets 0 in the counter 48.

The control circuit 46 opens and AND gate circuit 45 is opened if the output of ROM 55 is 0, and, if it is 1, the AND gate circuit is closed to prevent the oscillation pulse of the oscillator 41 from being fed into the counter 48 for the next one pulse. The memory content of ROM 55 is constructed to correct the nonlinearity of the temperature characteristic of the thermistor Rx.

FIG. 2 is a graph showing the mode of this nonlinearity correction. When the oscillation frequency changes linearly with respect to the temperature as indicated by line 11 shown in FIG. 2, the count value may be directly indicated as the temperature by properly selecting the gate time for counting the frequency. However, in the resistance bulb such as thermistor, since the resistance changes nonlinearly and the frequency is inversely proportional to the resistance, the change is nonlinear as indicated by line 12 in FIG. 2. When lines 11 and 12 are measured as digital values, they are quantized, becoming approximate curves as indicated by lines 13 and 14 in FIG. 2, respectively. When a simple frequency is counted as in line 13, the number goes up at every pulse as shown in Table 1. However, when the circuit is composed as shown in FIG. 1 and the correction ROM is stored as shown in Table 1, the line 14 can realize correction count as shown in Table 1.

TABLE 1

| 13 count number | Correction ROM content | 14 count number |
| --- | --- | --- |
| n | 0 | n |
| n + 1 | 0 | n + 1 |
| n + 2 | 0 | n + 2 |
| n + 3 | 0 | n + 3 |
| n + 4 | 1 | n + 4 |
| n + 5 | 0 | n + 4 |
| n + 6 | 0 | n + 5 |
| n + 7 | 0 | n + 6 |
| n + 8 | 1 | n + 7 |
| n + 9 | 0 | n + 7 |
| n + 10 | 1 | n + 8 |
| n + 11 | 0 | n + 8 |
| n + 12 | 1 | n + 9 |
| . | . | . |
| . | . | . |
| . | . | . |

When the counter number of counter 48 in FIG. 1 is the 4 count number of Table 1, the value of ROM 55 reading out the output of counter 48 as address is the correction ROM content in Table 1. When the counter 54 counts down to 0, the analog switch 43 is opened, and oscillation of the oscillator 41 is stopped, completing the operation of the counter 48. When the oscillator 41 stops oscillating, the control circuit 46 closes the AND gate circuit 45. In the latch circuit 51, the maximum value of the temperature measured so far is temporarily stored.

When the counter 48 finishes counting, the count value of the counter 48 and the value of the latch circuit 51 are compared in comparator circuit 50. When the count value is greater than the value of the latch circuit 51, this count value is temporarily held in the latch circuit 51. The value of the latch circuit 51 is displayed by indicator 57 through decoder driver 56.

Thus, according to this invention, in the thermometer for measuring the actual temperature from the resistance bulb having nonlinearity, there is a memory circuit which function to correct the nonlinearity of the resistance bulb, and when the counting of the oscillation frequency of the oscillator to which the resistance bulb is connected by means of the counter and by controlling the oscillation frequency according to the output of the memory circuit, the detected temperature may be directly measured by the count value of the oscillation frequency, allowing the memory capacity of memory circuit to be small and the circuit parts such as counters to be saved, so that the cost may be reduced.

While only certain embodiments of the present invention have been described, it will be apparent to those skilled in the art that various changes and modifications may be made therein without departing from the spirit and scope of the present invention as claimed.

What is claimed is:

1. A thermometer utilizing a temperature sensing element to detect a temperature, comprising:

oscillating means including a reference resistor, capacitor and said temperature sensing element in the form of a thermistor, for producing a pulsed output signal having a frequency related to the temperature being detected by the reference resistor, thermistor and capacitor;

counter means, operatively connected to said oscillating means, for counting a number of pulses present in said pulsed signal representative of the detected temperature and producing a counter output signal related to the number of pulses counted;

display means, operatively connected to said counter means, for developing and displaying the temperature being detected according to the number of pulses counted;

linearization means, operatively responsive to said output signal of said oscillating means and said counter output signal, for determining whether a certain pulse to be counted is to be suppressed on a pulse by pulse basis; and suppression means, responsive to said linearization means, for suppressing said certain pulse when said linearization means determines said certain pulse is to be suppressed, thereby linearizing the detection of the temperature.

2. The thermometer as claimed in claim 1, wherein said linearization means comprises a ROM for storing one-bit data and for providing a control signal, said one bit-data representing linearization data corresponding to the temperature sensing element; and wherein said suppression means comprises a gating circuit, operatively connected to said ROM, for suppressing the counting of said certain pulse in response to said control signal.

3. The thermometer as claimed in claim 1, wherein said oscillating means comprises:

an oscillator for producing said pulsed signal at a frequency related to a first or second time constant, said second time constant being a relationship between the reference resistor and the capacitor, said first time constant being a relationship between the thermistor and capacitor;

a control circuit, operatively connected to said oscillator, for causing either said first or said second time constant to be used by said oscillator; and overflow means, operatively connected to said control circuit and said counter means, for providing an overflow signal when an overflow is detected in said counter means;

said control circuit, in response to said overflow signal, causing said oscillator to change from using said first time constant to using said second time constant, thereby causing a change in the frequency of said pulsed signal.

4. A thermometer utilized for electronically detecting a temperature, comprising:

oscillating means, for producing a pulsed signal having a first frequency related to the temperature being detected by temperature sensing means;

counting means, operatively connected to said oscillating means, for counting a number of pulses present in said pulsed signal;

display means, operatively connected to said counting means, for displaying the temperature being detected according to the number of pulses counted;

overflow means, operatively connected to said counting means, for determining whether said counting means has exceeded a predetermined numeric value;

control means, operatively connected to said overflow means and said oscillating means, for causing said first frequency of said pulsed signal to change to a second frequency, said second frequency being related to a time constant corresponding to a reference oscillating circuit; and linearization means, operatively connected to said oscillating means and said counting means, for determining whether a certain pulse to be counted is to be suppressed on a pulse by pulse basis and for suppressing said certain pulse when said linearization means determines the suppression is desired, thereby linearizing the detection of the temperature.

5. The thermometer as claimed in claim 4, wherein said linearization means comprises:

a ROM for storing one-bit data said one-bit data representing linearization data corresponding to said temperature sensing means, said one bit-data providing a control signal; and a gating circuit, operatively connected to said ROM, for suppressing the counting of said certain pulse in response to said control signal.

6. The thermometer as claimed in claim 4, wherein said oscillating means comprises an oscillator for producing said pulsed signal at said first or second frequency, said first frequency being related to a first time constant, said first time constant being a relationship between said temperature sensing means and a capacitor, said reference oscillating circuit including a reference resistor and said capacitor.

* * * * *